United States Patent Office 3,391,116
Patented July 2, 1968

3,391,116
PROCESS FOR THE PREPARATION OF HIGH EPOXIDE CONTENT EPOXY RESINS AND RELATED PRODUCTS
Tjerk van der Hauw, Katwijk, Netherlands, assignor to Kunstharsfabriek Synthese N.V., Katwijk aan Zee, Netherlands, a limited-liability company
No Drawing. Filed Mar. 17, 1964, Ser. No. 352,648
Claims priority, application Netherlands, Mar. 22, 1963, 290,532
23 Claims. (Cl. 260—52)

ABSTRACT OF THE DISCLOSURE

A process for producing epoxy resins by condensing formaldehyde with an aromatic chlorohydrin derived from a phenol, a thiophenol or an aminobenzene and dehalogenating the resulting condensation product to produce an epoxy resin of high epoxide content.

---

This invention relates to a process for the preparation of epoxy resins and related products. One well known group of epoxy resins are those obtained by the reaction of epihalohydrins with compounds having phenolic hydroxyl groups. These are made by firstly producing a compound having two or more phenolic hydroxyl groups and then etherifying these hydroxyl groups with an epihalohydrin and then either causing dehalogenation to occur simultaneously, or inducing subsequent dehalogenation. A second group of epoxy resins are those derived from aromatic polyamines, such as 4,4'-diaminodiphenyl methane and 4,4'-di(monoalkylamino)-diphenyl methane. Such starting materials are obtained by condensing aniline or N-alkyl aniline with formaldehyde and the glycidyl group is the introduced to form an epoxy resin.

According to the invention, similar epoxy resins are made by a novel process which comprises condensing with formaldehyde an aromatic chlorohydrin derived from a phenol, from a thiophenol, or from an amino benzene, and dehalogenating the condensation product. Thus, in this method the glycidyl group is introduced as a first stage instead of as a final stage in the preparation of an epoxy resin. This is done by reacting epichlorohydrin with a compound having a phenolic hydroxyl group, a thiophenolic group or an aromatic amino group. As the next stage of the method of producing an epoxy resin, the product containing the chlorohydrin group is reacted with formaldehyde, and finally the epoxy group is liberated by dehalogenating the condensation product.

The process according to the invention has several advantages. In the known process of reacting, for example, Bisphenol A, also known as bis-(p-hydroxyphenyl)-dimethyl methane, with epichlorohydrin, the epoxide content of the product is at most 85 to 90% of the epoxide content of the pure, theoretical, di-glycidyl ether, since during the etherification of the phenolic hydroxyl groups, epoxide groups which have already been introduced react further with free hydroxyl groups, thus producing higher molecular weight products. In accordance with the invention, for example, starting from o-cresyl chlorohydrin, an epoxide content of about from 95% based on the pure diglycidyl ether can be obtained, since during the dehalogenation no free phenolic hydroxyl groups are available (the theoretical epoxide content of the pure di-glycidyl ether is not obtained, because also in the process according to the invention, just as in the prior art processes, sub-reactions occur during the dehalogenation step). As a result of the higher epoxide content, the viscosity of an epoxy resin obtained according to the invention is lower than that of resins obtained from bis-phenol according to the prior art methods. Further, by completely curing the products in the invention, products can be obtained which have a higher degree of cross-linkage and which are, therefore, less soluble in water and other solvents.

Another advantage of the invention is that it is possible to co-react with the aromatic chlorohydrin an aromatic hydrocarbon or ether which is capable of such condensation. Examples of suitable aromatic hydrocarbons are m-xylene, mesitylene, pseudocumene, durene, naphthalene, alpha or beta methyl naphthalene, anthracene, biphenyl or aromatic mixtures containing such compounds, such as technical grade xylene or high boiling aromatic fractions obtained in the petroleum or coal industry. Examples of suitable aromatic ethers are diphenyl ether, diphenylene oxide, alpha, gamma-di-o-cresyl glyceryl ether and 1,2-dimethyl benzene. The amount of aromatic hydrocarbon or ether which can be condensed into the epoxy resin depends on the amount of formaldehyde present. By condensing in a less costly aromatic, such as technical grade xylene or naphthalene, it is possible to produce inexpensive epoxy resins.

It is also possible to condense the undehalogenated condensation product further by reacting it with a polyvalent alcohol of the type used previously for the production of epoxy resins. Thus it is preferably a compound having two or more phenolic hydroxyl groups, for example Bisphenol A. This further condensation is carried out simultaneously with the dehalogenation.

The aromatic chlorohydrins used can be obtained in a known manner and in high yield from phenols, thiophenols or aromatic amines by reaction with epichlorohydrin, possibly in the presence of tertiary amines or quaternary ammonuim salts as catalyst (see e.g., J. Chem. Soc., 1954, page 1571). Examples of aromatic chlorohydrins which may be used are phenyl chlorohydrin ether, o-cresyl chlorohydrin ether, o-chlorophenyl chlorohydrin ether and resorcinyl chlorohydrin ether, all these compounds containing in the aromatic nucleus at least one group reactive to formaldehyde. Examples of aromatic chlorohydrins prepared from anilines are N,N-di-(3-chloro-2-hydroxy-propyl)aniline and N-methyl, N-(3-chloro-2-hydroxypropyl)aniline.

The formaldehyde used may be in one of a variety of forms. Thus it may be used as an aqueous solution, as a solution in a lower alcohol, as a formal of a lower alcohol or as a polymer, such as paraformaldehyde or trioxane, but formalin which contains 35 to 40% of formaldehyde is preferred.

The condensation of the aromatic chlorohydrin with formaldehyde is carried out in the presence of a condensing agent. Generally this is an inorganic or organic acid or Lewis acid. Examples are sulphuric acid, the hydrohalogen acids, phosphoric acid, zinc chloride, tin chloride, formic acid and oxalic acid, all possibly in acetic acid medium. The amount of condensing agent used depends on the reaction conditions, on the formaldehyde source and on the particular condensing agent. The optimum quantities and conditions can readily be ascertained by previous experiment.

Whether the condensation product of formaldehyde and the aromatic chlorohydrin is a dichlorohydrin or a polychlorohydrin depends on the particular reactants, the reaction conditions and the ratios of the reactants. The molar ratio of aromatic chlorohydrin to formaldehyde can be varied within wide ranges. If no aromatic hydrocarbon or ethers are used as reaction components, said molar ratio can be varied, for example, from 8:3 to 4:3. However, these limits are not critical. With larger amounts of aromatic chlorohydrin, products of lower viscosity are obtained and with lesser amounts of aromatic chlorohydrin products of higher viscosity are obtained. When the condensation has been completed, the condensing agent is washed out and the product is then dehalogenated. To effect the dehalogenation, the product may be dissolved in a suitable solvent, such as secondary butanol, acetone or methyl ethyl ketone. The dehalogenation is then carried out, for example, by heating with a solution of caustic soda, potassium hydroxide or an alkali metal complex such as sodium aluminate or sodium silicate.

The preferred condensing agent is sulphuric acid and in this case it is preferred that the sulphuric acid should be mixed with formalin, as the source of formaldehyde, prior to addition to the aromatic chlorohydrin. Thus, it is added to the formalin with cooling until its concentration, based on the total weight of water and sulphuric acid, is from 40 to 60%, preferably 45 to 55%. The condensation is then effected by dispersing the aromatic chlorohydrin in the formalin-sulphuric acid mixture while constantly agitating and heating the mixture gradually to boiling temperature under a reflux condenser. The condensation is then continued for 3 to 4 hours.

The product resulting from the condensation followed by dehalogenation is a hardenable thermosetting epoxy resin which can be cured with the usual hardeners.

The epoxy resins obtained by the process according to the invention may be used for the commonly known applications as glues, cast resins, laminates, paints, lacquers, etc.

The following examples illustrate the invention. Examples I to VIII illustrate the condensation of aromatic chlorohydrins with formaldehyde in the presence of a condensing agent, followed by dehalogenation, while Example IX shows the further condensation of the condensation product with a bi-valent phenol. Examples X to XVII show the use of aromatic hydrocarbons and ethers as reaction components in preparing epoxy resins.

Example I 85 g. of $H_2SO_4$ (96%) were added, while cooling, to 125 g. of a 37% formaldehyde solution, and 497 g. of phenyl chlorohydrin ether were then added. The mixture was heated over 1½ hours to boiling under reflux conditions, and was boiled for 3 hours until condensation was completed. Water was then added and the condensing agent (sulphuric acid) was washed out. The resin obtained was dissolved in an equal amount, by weight, of acetone and the solution was heated to boiling under reflux conditions. At intervals of 20 minutes six portions, of 80 grams each, of a 25% caustic soda solution were added and after 4 hours the saline phase was removed and the solvent distilled off under reduced pressure at a temperature of 150° C.

The product obtained had an epoxide content of 9.5% O, a viscosity of 60 poises (25° C.) and contained a mixture of di- and poly-epoxides with about 4% monoepoxide. To cure the resin 12.2 parts of diethylene triamine were mixed with 100 parts of the product and left to stand for 16 hours at room temperature, the mixture then being heated for 4 hours at 65° C. and finally for 1 hour at 120° C. The cured resin had the following characteristics: deformation temperature (determined according to A.S.T.M.–648–264) 90° C. bending strength 1300 kg./cm.$^2$, percent water absorption after 1 month at 20° C.: 0.5%, percent extractable with boiling methyl ethyl ketone: 2%.

Example II

The process of Example I was repeated using 130 g. of 37% formaldehyde solution, 90 g. concentrated sulphuric acid, 497 g. of phenyl chlorohydrin ether. The resin obtained had an epoxide content of 9.7% O, a viscosity of 180 poises (25° C.) and contained besides about 2% monoepoxide a mixture of di- and polyepoxides. The resin was completely cured with 12.5 parts of diethylene triamine per 100 parts resin. The following characteristics were measured: deformation temperature, 107° C., bending strength 1400 kg./cm.$^2$, percent water absorption after 1 month at 20° C.: 0.5%, percent extractable with methyl ethyl ketone: 3%.

Example III

Example I was repeated using 135 g. of 37% formaldehyde solution, 93 g. of concentrated sulphuric acid and 947 g. of phenyl chlorohydrin ether. The resin obtained had an epoxide content of 9.7% O, a viscosity of 325 poises (25° C.) and contained, besides about 1.5% monoepoxide, a mixture of di- and polyepoxides. The resin was completely cured with 12.5 parts of diethylene triamine per 100 parts of resin and the cured resin had the following characteristics: deformation temperature: 130° C., bending strength: 1450 kg./cm.$^2$, percent water absorption after 1 month at 20° C.: 0.6%, extractable with methyl ethyl ketone: 0%.

Example IV 2600 g. of 37% formaldehyde solution were mixed as in Example I with 1615 g. of concentrated sulphuric acid, and 12 kg. of o-cresyl chlorohydrin ether were then dispersed in the mixture, while agitating. After the condensation was completed and the product washed as in Example I, 12.5 kg. of acetone were added and the mixture heated to boiling temperature under reflux conditions. Six portions each of 1800 g. of 25% solution of caustic soda were added as described in Example I. After removal of the salt solution phase and solvent a resin was obtained having the following properties: epoxide content 8.8% O, viscosity 80 poises (25° C.). On exposure to daylight, a colorless resin was obtained, which almost completely crystallized out after some time. The resin was completely cured with 65 parts of phthalic acid anhydride per 100 parts of resin by heating for 8 hours at 150° C. and the cured resin had the following characteristics: deformation temperature: 95° C., bending strength: 1330 kg./cm.$^2$, water absorption after 1 month at 20° C.=0.20%, percent extractable with methyl ethyl ketone: 2.8%.

Example V

This example illustrates the use of paraformaldehyde. 401 g. of o-cresyl chlorohydrin ether, 38 g. of paraformaldehyde and 100 g. of benzene were mixed in a three-neck flask having an agitator, a thermometer and a device for the removal of reaction water by azeotropic distillation. After addition of 20 g. of 50% $H_2SO_4$ the mixture was heated to boiling and constantly agitated, using a reflux condenser and the condensation was continued for 4 hours. After washing out the condensing agent the benzene was distilled off. After dehalogenation, as in Example I, a resin was obtained having an epoxide content of 8.7% O and a viscosity of 100 poises (25° C.).

Example VI

The next examples illustrate the use of condensing agents other than sulphuric acid.

401 g. of o-cresyl chlorohydrin ether, 32 g. of paraformaldehyde, 300 g. of glacial acetic acid and 60 g. of oxalic acid were mixed and boiled for 20 hours using a reflux condenser. The major portion of the acetic acid was then removed by distillation at reduced pressure at 110° C., and the resin residue was washed with water until neutral. After dissolving the resin in acetone the resin was dehalogenated as in Example I. A resin was obtained which had an epoxide content of 5.8% of O and a chlorine content of 0.5%.

Example VII 401 g. of o-cresyl chlorohydrin ether, 81 g. of 37% formalin and 200 g. of formic acid (98%) were heated at about 100° C. for 20 hours. The upper phase of the heterogeneous mixture obtained was poured off and the residue was washed until neutral. A 50% solution of the resin in acetone was prepared and was treated successively with 7 portions each of 56 g. of 25% NaOH solution, the salt solution phase being removed after the fourth, sixth and seventh additions. After distilling off the solvent at 150° C. at 5 cm. pressure an epoxy resin was obtained having a content of 8.28% O and 0.63 Cl and containing 2.5% monoepoxide.

Example VIII

Whereas in Examples II and III the ratio of chlorohydrin ether:formaldehyde is 1.66:1 and 1.60:1 respectively, in this example it is 1.33:1.

172 g. of 37% formaldehyde solution were mixed with 118 g. of concentrated sulphuric acid as in Example I, and 535 g. of o-cresyl chlorohydrin ether were dispersed in the mixture while agitating. After heating for 1 hour at 80° C. the mixture was heated for another 3 hours at about 114° C., and after completion of the condensation the condensing agent was removed by washing. The residue was dissolved in its own weight of acetone and six portions each of 80 g. of 25% solution of caustic soda were added as described in Example I. After removal of the salt solution phase and the solvent a resin was obtained having the following characteristics: epoxide content 7.28% O and 3.16% Cl.

Example IX

This example illustrates the production of resins of higher molecular weight by adding a bivalent phenol to the mixture to be dehalogenated.

289 g. of condensate of o-cresyl chlorohydrin ether with formaldehyde, as obtained in Example IV, were dissolved in 360 g. of secondary butanol, 80 g. of bisphenol A and 63 g. of water. The mixture was heated at 80° C. when four portions, each of 42 g. of 25% caustic soda solution were added at intervals of 20 minutes. Twenty minutes after adding the last portion the salt solution phase was separated. In a similar manner two further portions of caustic soda were added followed by 35 g. of water. Four hours after the beginning of the reaction the second salt solution phase produced was removed. After washing out salt and traces of caustic soda, the solvent was distilled off. The resin obtained had an epoxide content of 2.91% of O, a softening point of 75° C. (determined with ring and ball) and a viscosity of 19 dp. at 25° C. as 40% solution in diethylene glycol butyl ether.

The following examples illustrate the co-condensation of aromatic chlorhydrins with aromatic hydrocarbons and others.

Example X 173 g. of 37% formaldehyde solution were mixed with 145 g. of concentrated sulphuric acid, and 401 g. of o-cresyl chlorohydrin ether and 106 g. of m-xylene (95%) were dispersed in the mixture, while vigorously agitating. Condensation was carried out as described in Example I and 100 g. of water were then added. The mixture was steam distilled and it appeared that 2 g. of metaxylene were not combined in the resin. After washing the sulphuric acid from the mixture, an equal amount by weight of acetone was added to the residue, followed by six portions, each of 60 g., a 25% solution of caustic soda at boiling temperature. After removal of the salt solution phase and the solvent, a highly viscous resin was obtained having an epoxide content of 6.75% O and a content of monoepoxide of about 1%. After curing with an equivalent amount of diethylene triamine, a resin having the following characteristics was obtained: deformation temperature 81° C., bending strength 1500 kg./cm.², percent water absorption after 1 month (20° C.): 0.2%, percent extractable in boiling methyl ethyl ketone: 4.4%.

Example XI 173 g. of 37% formaldehyde solution were mixed with 145 g. of concentrated sulphuric acid and then 401 g. of o-cresyl chlorohydrin ether and 130 g. of technical xylene (containing about 60% m-xylene, 20% o-xylene, 10% o-xylene and 10% ethyl benzene) were added as in Example X. After completion of the condensation it appeared, as a result of a number of tests, that 100 to 105 g. of xylene were bound in the resin. In the same way as in Example X a resin was obtained having the following constants: epoxide content 6.3% O, content of volatile components 0.5%. After completely curing the resin with 8 parts of diethylene triamine per 100 parts of resin, a resin having the following characteristics was obtained: deformation temperature 70° C., bending strength: 1450 kg./cm.², water absorption after one month: 0.2%, percent extractable in boiling methyl ethyl ketone: 7.5%.

Example XII

Example X was repeated, using 120 g. 98% mesitylene instead of m-xylene. After steam distillation, it appeared that about 5 g. of mesitylene were not combined in the resin. The resin obtained had the following constants: epoxide content 6.5%, a content of volatile components: about 1%. After completely curing the resin with the equivalent amount of diethylene triamine a resin having the following characteristics was obtained: deformation temperature 70° C., bending strength 1450 kg./cm.², water absorption after one month (20° C.): 0.3%; percent extractable in boiling methyl ethyl ketone: 2%.

Example XIII

Example XII was repeated, using 120 g. of "Solvesso" 100, a trade name of Esso Nederland, N.V. for an aromatic hydrocarbon mixture instead of mesitylene. After the condensation was complete 16 g. of aromatic hydrocarbon were recovered by steam distillation. After washing out and dehalogenating a highly viscous resin was obtained having an epoxide content of 6.2% O, and a content of volatile components of, at most, 1%. After completely curing the resin with 7.9 parts of diethylene triamine per 100 parts of resin a resin having the following characteristics was obtained: deformation temperature: 72.5%, bending strength: 1425 kg./cm.², percent water absorption after 1 month (20° C.): 0.2%, percent extractable in boiling methyl ethyl ketone: 5.9%.

Example XIV 155 g. of 37% formaldehyde solution were mixed with 132 g. of concentrated sulphuric acid and 361 g. of o-cresyl chlorohydrin ether and 121 g. of durene were added and the mixture heated to 80° C. while vigorously agitating. After maintaining this temperature for 1 hour, the temperature was raised to boiling temperature, and the condensation was continued at this temperature for 3 hours. By steam distillation, 8 g. of durene were recovered. After washing out and dehalogenating from an acetone solution a tough resin was obtained having an epoxide content of 6.24% O.

Example XV 155 g. of 37% formaldehyde solution were mixed with 132 g. of concentrated sulphuric acid and 361 g. of o-cresyl chlorohydrin ether and 115 g. of naphthalene were added. The mixture was heated to 80° C. while vigorously stirring and after maintaining this temperature for 1 hour, the temperature was raised to boiling, at which temperature the condensation was continued for another three hours using a reflux condenser. After steam distillation about 3 g. of naphthalene were recovered. After washing out and dehalogenating from an acetone solution, a resin was obtained having an epoxide content of 6.13%, a softening point of 48° C. (determined with ring and ball) and a chlorine content of 1.12% Cl. The resin was dissolved in acetone and 10.3 parts of metaphenylene diamine were added per 100 parts of resin. A glass fabric (type SV 3019 with Volan yarn finish) was impregnated with the resin solution and dried for 18 hours at room temperature. 12 layers were then pressed together for 10 minutes at 150° C. at a pressure of 3.5 kg./cm.², whereafter the pressure was increased to 14 kg./cm.². After 50 minutes the laminate was after-cured for 1 hour at 200°

C. in a furnace. The bending strength was, at 20° C., 6900 kg./cm.$^2$, and the bending modulus was 2.1×10$^5$ kg./cm.$^2$. The glass content of the laminate was about 80%.

Example XVI 155 g. of 37% formaldehyde solution were mixed with 132 g. of concentrated sulphuric acid and then 361 g. of o-cresyl chlorohydrin ether and 153 g. of diphenyl ether were added and condensed in the usual way. After completion of the reaction 3 g. of diphenyl ether were recovered by steam distillation. After washing, the residue was dehalogenated in acetone solution to leave a resin having an epoxide content of 5.65% 0. The resin was dissolved in acetone and 9.4 parts of metaphenylene diamine per 100 parts of resin were added. A glass fabric (type SV 3019 with Volan yarn finish) was impregnated with the solution of the resin and then dried for 18 hours at room temperature. 12 layers were then pressed together for 10 minutes at 150° C. at a pressure of 3.5 kg./cm.$^2$, whereafter the pressure was increased to 14 kg./cm.$^2$. After 50 minutes the laminate was after-cured for 1 hour at 200° C. in a furnace. The bending strength was at 20° C. 7000 kg./cm.$^2$, and the bending modulus was 2.2×10 kg./cm.$^2$. The glass content of the laminate was about 80%.

Example XVII 138 g. of 37% formaldehyde solution were mixed with 95 g., of concentrated sulphuric acid and while agitating the mixture, 321 g. of o-cresyl chlorohydrin ether and 218 g. of alpha, gamma-di-o-cresyl glyceryl ether were dispersed in the mixture. A condensation was conducted as in Example I. After washing out the condensing agent and dehalogenating, a somewhat sticky solid resin was obtained having an epoxide content of 4.65% 0.

What is claimed is:

1. A process for the production of an epoxy resin, said process comprising condensing with formaldehyde an aromatic chlorohydrin obtained by reacting epichlorohydrin with one member of the group consisting of phenols, thiophenols and amino benzenes to form a condensation product, and dehydrohalogenating the thusly obtained condensation product.

2. A process for the production of an epoxy resin, said process comprising condensing with formaldehyde an aromatic chlorohydrin obtained by reacting epichlorohydrin with one member of the group consisting of phenols, thiophenols and amino benzenes and one member of the group consisting of aromatic hydrocarbons and ethers having at least two reactive positions in the aromatic nucleus to form a condensation product, and dehydrohalogenating the thusly obtained condensation product.

3. A process according to claim 2 in which the aromatic hydrocarbon is m-xylene.

4. A process according to claim 2 in which the aromatic hydrocarbon is technical grade xylene.

5. A process according to claim 2 in which the aromatic hydrocarbon is mesitylene.

6. A process according to claim 2 in which the aromatic hydrocarbon is naphthalene.

7. A process according to claim 2 in which the aromatic ether is diphenyl ether.

8. A process according to claim 2 in which the aromatic ether is alpha, gamma-di-o-cresyl glyceryl ether.

9. A process according to claim 1 in which the aromatic chlorohydrin is derived from phenol.

10. A process according to claim 1 in which the aromatic chlorohydrin is derived from o-cresol.

11. A process according to claim 1 in which the aromatic chlorohydrin is derived from o-chlorophenol.

12. A process according to claim 1 in which the aromatic chlorohydrin is derived from resorcinol.

13. A process according to claim 1 in which the aromatic chlorohydrin is derived from aniline.

14. A process according to claim 1 in which the aromatic chlorohydrin is derived from N-methyl aniline.

15. A process according to claim 1 in which the condensation product is heated with a polyvalent alcohol and a dehydrohalogenating agent to effect dehydrohalogenation and further condensation of the condensation product.

16. A process as claimed in claim 2 in which the condensation product is heated with a polyvalent alcohol and a dehydrohalogenating agent to effect dehydrohalogenation and further condensation of the condensation product.

17. A process according to claim 15 in which the polyvalent alcohol is bis-phenol A.

18. A process according to claim 16 in which the polyvalent alcohol is bis-phenol A.

19. A hardenable epoxy resin produced by a process according to claim 2.

20. A hardened epoxy resin obtained by curing a hardenable epoxy resin according to claim 19.

21. An article of a hardened epoxy resin according to claim 20.

22. A process for the production of an epoxy resin, said process comprising condensing with formaldehyde an aromatic chlorohydrin obtained by reacting epichlorohydrin with one member of the group consisting of phenols, thiophenols and amino benzenes to form a condensation product, and dehydrohalogenating the thusly obtained condensation product; said process further comprising controlling the viscosity of the resin by varying the amount of aromatic chlorohydrin inversely to the viscosity desired.

23. A process for the production of an epoxy resin, said process comprising condensing with formaldehyde an aromatic chlorohydrin obtained by reacting epichlorohydrin with one member of the group consisting of phenols, thiophenols and amino benzenes, and one member of the group consisting of aromatic hydrocarbons and ethers having at least two reactive positions in the aromatic nucleus to form a condensation product, and dehydrohalogenating the thusly obtained condensation product; said process further comprising controlling the viscosity of the resin by varying the amount of aromatic chlorohydrin inversely to the viscosity desired.

References Cited

UNITED STATES PATENTS

| | | | |
|---|---|---|---|
| 2,801,989 | 8/1957 | Farnham. | |
| 2,844,553 | 7/1958 | Taylor et al. | 260—52 |
| 2,943,096 | 6/1960 | Reinking | 260—53 |
| 2,951,825 | 9/1960 | Reinking. | |
| 3,056,762 | 10/1962 | Tringali | 260—52 |
| 3,133,900 | 5/1964 | McDonald | 260—52 |

WILLIAM H. SHORT, *Primary Examiner.*

E. M. WOODBERRY, *Assistant Examiner.*